United States Patent [19]

Takeyama et al.

[11] Patent Number: 5,706,042
[45] Date of Patent: Jan. 6, 1998

[54] INK AND SHEET FOR INK JET RECORDING AND INK JET RECORDING METHOD

[75] Inventors: Toshihisa Takeyama; Noritaka Nakayama, both of Hino, Japan

[73] Assignee: Konica Corporation, Japan

[21] Appl. No.: 568,243

[22] Filed: Dec. 6, 1995

[30] Foreign Application Priority Data

Dec. 12, 1994 [JP] Japan .................................. 6-307645

[51] Int. Cl.$^6$ .................................................. B41J 2/15
[52] U.S. Cl. .......................... 347/100; 347/102; 347/105; 347/96; 106/31.43
[58] Field of Search ......................... 347/100, 96, 105, 347/102; 106/31.43

[56] References Cited

U.S. PATENT DOCUMENTS

| 4,554,555 | 11/1985 | Aruga et al. ........................... 106/20 |
| 4,824,485 | 4/1989 | Tanaka et al. . |
| 4,987,049 | 1/1991 | Komamura et al. . |
| 5,322,832 | 6/1994 | Takeyama et al. . |
| 5,358,922 | 10/1994 | Nakayama et al. . |
| 5,428,383 | 6/1995 | Shields et al. ........................... 347/96 |
| 5,432,144 | 7/1995 | Komamura et al. . |

FOREIGN PATENT DOCUMENTS

| 0504825 A1 | 9/1992 | European Pat. Off. . |
| 3713624 A1 | 11/1987 | Germany . |

Primary Examiner—Valerie Lund
Attorney, Agent, or Firm—Jordan B. Bierman; Bierman, Muserlian and Lucas LLP

[57] ABSTRACT

A method of recording an image on a recording sheet is disclosed which comprises the step of jetting an ink from a nozzle onto the recording sheet, wherein the ink comprises a dye capable of co-ordinate bonding with a metal ion in two or more coordination positions and the recording sheet comprises a compound containing a metal ion which is capable of co-ordinate bonding with the dye in two or more coordination positions to record the image on a recording sheet.

11 Claims, No Drawings

INK AND SHEET FOR INK JET RECORDING AND INK JET RECORDING METHOD

FIELD OF THE INVENTION

The present invention relates to ink for recording used for an ink-jet recording apparatus, a recording sheet suitable therefor and a suitable ink-jet recording method using the same.

BACKGROUND OF THE INVENTION

Compared to other recording systems such as a thermal transfer diffusion system, a thermal sublimation transfer system and an electrophotography system that can form full colors images, the ink-jet recording is an excellent recording system in terms of various performances such as that increased printing speed is possible, recording is possible on uneven recording sheets, gradation can be expressed and running cost is inexpensive. Therefore, this technology has been widely utilized.

Ink for recording used in ink-jet recording apparatus requires that no clogging occurs on the nozzle and sufficient contrast or density for recording can be obtained. For such performance requirements, considerable factors have been improved by improving additives for the recording ink.

However, in addition to the above-mentioned requirements, recently the following issues have also come to be required specifically: durability of the recorded image, high resolution recording, sharpness and color reproducibility of an image in the case of full color and recording on plain paper. To meet such requirements, especially in the case of recording on plain paper, attempts wherein a specific additive is used in recording ink were disclosed in Japanese Patent Publication Open to Public Inspection (hereinafter, Japanese Patent O.P.I. Publication) Nos. 213376/1989, 107989/1994 and 107989/1994.

In addition, in order to cope with high resolution recording, many approaches have been attempted from a recording apparatus side such as a recording head. In addition, from a material side, in order to prevent blurring, Japanese Patent O.P.I. Publication Nos. 57862/1981, 203483/1989 and 107990/1994 disclose technologies which add specific additives to the recording ink and Japanese Patent O.P.I. Publication Nos. 3808/1984, 63191/1985 and 312572/1994 disclose technologies which improve absorption ability of recording ink by changing additives and bases of the recording sheet. However, depending upon the recording ink composition, sufficiently desirable effects could not be obtained.

Problems related to durability of recorded images derive mostly from dyes in the recording ink. Therefore, improvement has been attempted by adding various additives such as an anti-oxidation agent, a heat stabilizer, a light stabilizer and a porous pigment in the recording ink and/or in the ink receiving layer. However, sufficient results have not been obtained yet.

In addition, attempts which improve durability of images by improving dyes have also been conducted.

Recording ink is classified as water-based ink and non-water-based ink. Recently, water-based ink has been used in an ink-jet recording apparatus wherein high quality recording on paper is required. Such requests were coped with by the use of a dye excellent in terms of image durability selected from dyes classified as acid dyes, direct dyes, basic dyes, reflective dyes and a food-use dyes in the color index. However, sufficiently satisfactory results have not been obtained.

In addition, there are not many dyes which can cope with color reproducibility problems. Therefore, depending upon recorded images, sufficiently satisfactory images have not yet been obtained.

SUMMARY OF THE INVENTION

The present invention was attempted based on the above-mentioned conditions. Namely, an objective of the present invention is to provide ink for ink-jet recording, sheet suitable for ink-jet recording and a method of ink-jet recording using the same, which are excellent in full color image recording, image fastness and image sharpness without image blurring.

DETAILED DESCRIPTION OF THE INVENTION

The above object of the invention can be attained by the following.

① Ink for ink-jet recording comprising a dye capable of co-ordinate bonding with a metal ion in two or more coordination positions, wherein the dye is selected from the group consisting of the following formulas (1) through (9) or the dye is a water soluble dye or ink further comprising a compound containing a metal ion which is capable of co-ordinate bonding with the dye in two or more coordination positions or ink wherein the metal ion is a transition metal ion,

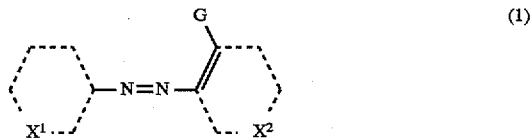

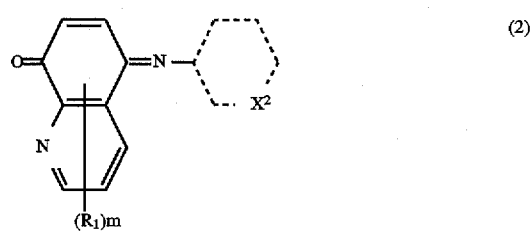

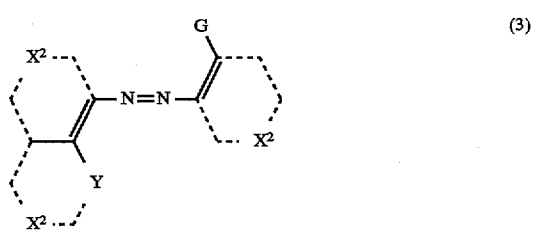

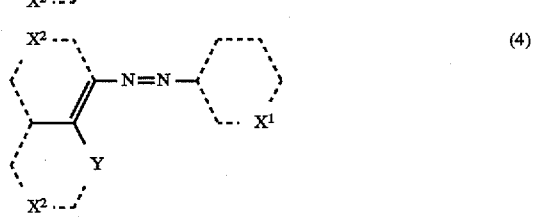

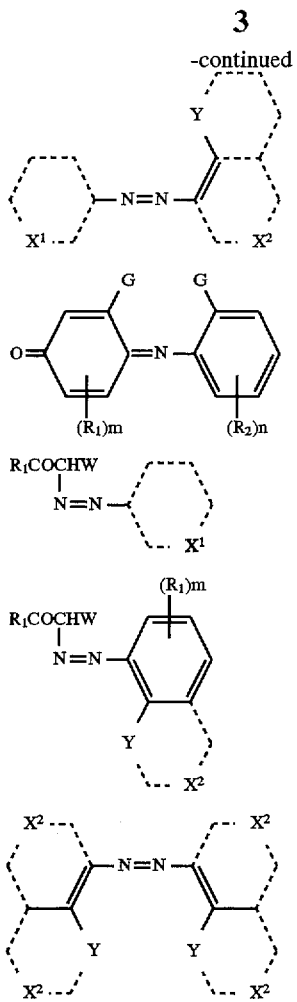

wherein $X^1$ represents an atomic group necessary to form a 5- to 7-membered heterocyclic or aromatic carbocyclic ring in which at least one position adjacent to the carbon atom bonding with an azo group is substituted with a nitrogen, oxygen, sulfur, selenium or tellurium atom; $X^2$ represents an atomic group to form a 5- to 7-membered carbocyclic or heterocyclic ring, in which the carbocyclic or heterocyclic ring may have a substituent; G represents a chelating group; W represents —$COR_3$ or —$CSR_3$; Y represents —O—, —S—, —N=, —NH— or —$NR_4$—; m and n independently represent an integer of 1 to 5; $R_1$ and $R_2$ independently represent a hydrogen atom, a halogen atom, a cyano group, an alkyl group, an alkenyl group, an alkoxy group, an alkylsulfonamide group, an arylsulfonamide group, an anilino group, an acylamino group, an alkylureido group, an arylureido group, an alkoxycarbonyl group, an alkoxycarbonylamino group, a carbamoyl group, a sulfamoyl group, a sulfo group, a carboxy group, an aryl group or a heterocyclic group; $R_3$ represents a hydrogen atom, an alkyl group, an alkenyl group, an alkoxy group, an alkylsulfonamide group, an arylsulfonamide group, an anilino group, an acylamino group, an alkylureido group, an arylureido group, a carbamoyl group, a sulfamoyl group, an aryl group or a heterocyclic group; and R4 represents an alkyl group, an alkenyl group, an aryl group or a heterocyclic group.

② sheet for ink-jet recording comprising a compound containing a metal ion which is capable of co-ordinate bonding with the above dye represented by the above formulas (1) through (9) in two or more coordination positions, wherein the sheet is recorded with the ink for ink-jet recording described in ① above or the ink wherein the metal ion is a transition metal ion, or ③ (a) a method of recording an image on a recording sheet comprising the step of jetting an ink from a nozzle onto the recording sheet, wherein the ink comprises a dye capable of co-ordinate bonding with a metal ion in two or more coordination positions and the recording sheet comprises a compound containing a metal ion which is capable of co-ordinate bonding with the dye in two or more coordination positions, (b) a method of recording an image on a recording sheet comprising the steps of jetting an ink from a nozzle onto at least image portions of the recording sheet, the ink comprising a compound containing a metal ion capable of co-ordinate bonding with a dye in two or more coordination positions; and then jetting a recording ink from a nozzle, the recording ink comprising a dye capable of co-ordinate bonding with the metal ion in two or more coordination positions, (c) a method of recording an image on a recording sheet comprising the steps of jetting a recording ink from a nozzle onto the recording sheet, the recording ink comprising a dye capable of co-ordinate bonding with a metal ion in two or more coordination positions; and then jetting an ink from a nozzle onto at least image portions of the recording sheet, the ink comprising a compound containing a metal ion capable of co-ordinate bonding with the dye in two or more coordination positions, or (d) a method of (a), (b) or (c) above, wherein after recording an image on the recording sheet, the recording sheet is subjected to heat treatment.

The ink or sheet for ink-jet recording of the invention and a method of ink-jet recording using the same will be explained in detail below.

(1) Ink for recording
<First embodiment>

This invention is characterized in that a dye having a specific composition and capable of co-ordinate bonding with a metal ion in two or more coordination positions is used as a dye contained in the ink.

The chelating group represented by G in formulas (1) through (9) may be independent, may combine with the adjacent ring represented by $X^2$, or may combine with $R_1$ or $R_2$. $R_1$ or $R_2$ may be the same or different.

When water is used as a solvent in an ink forming composition described later, the 5- to 7-membered carbocyclic or heterocyclic ring represented by $X^1$ or $X^2$ preferably has a substituent, at least one of the substituents preferably is preferably a hydrophilic group represented by —R—OZ, —R—COOZ or —R—$SO_3$Z, wherein R represents an alkyl group, an alkenyl group, an alkoxy group, an alkylsulfonamide group, an arylsulfonamide group, an anilino group, an acylamino group, an alkylureido group, an arylureido group, an alkoxycarbonyl group, an alkoxycarbonylamino group, a carbamoyl group, a sulfamoyl group, a sulfo group, a carboxy group, an aryl group or a heterocyclic group; Z represents a hydrogen atom, an alkali or alkali earth metal such as sodium, potassium, magnesium or calcium, 5A group atom onium ion such as an ammonium or phosphonium ion or 6A group atom onium ion such as a sulfonium or telluronium ion.

$R_1$ through $R_4$ are preferably have a substituent, and at least one of the substituents preferably has the above described hydrophilic group.

The chelating group represented by G represents —OR', —NHR', —SR', —SeR' or —TeR', wherein R' represents a hydrogen atom, an alkyl group, a phenyl group or a carbonyl group. G is, for example, —OH, —$OCH_3$, —$OC_6H_5$, —$OCOCH_3$, —$OCOC_2H_4CO_2K$, —$NHCOCH_3$, —$NHCOC_3H_6CO_2Na$, —$NHCOC_4H_8CO_2K$, or —$SCH_3$.

The typical dye examples of the invention will be shown below, but the invention is not limited thereto.
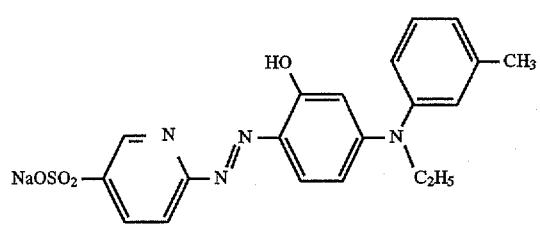
(D-1)
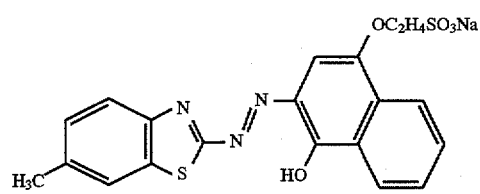
(D-2)
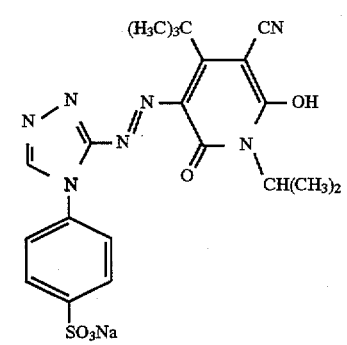
(D-3)
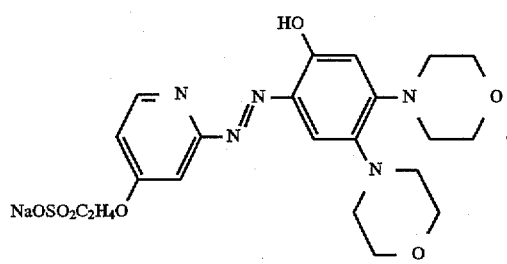
(D-4)
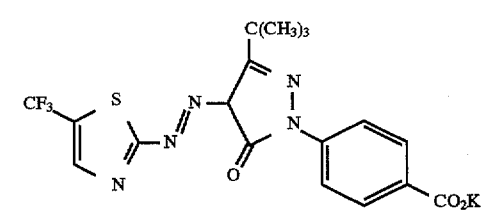
(D-5)
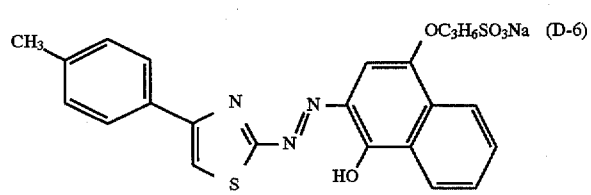
(D-6)
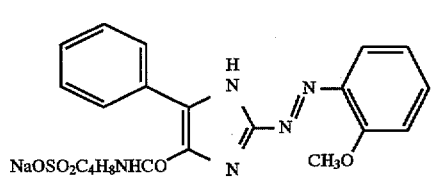
(D-7)
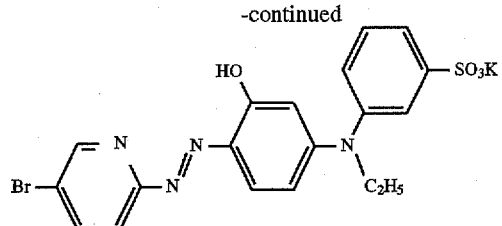
(D-8)
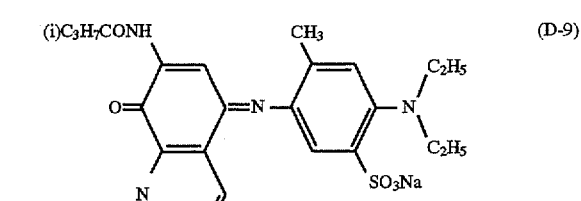
(D-9)
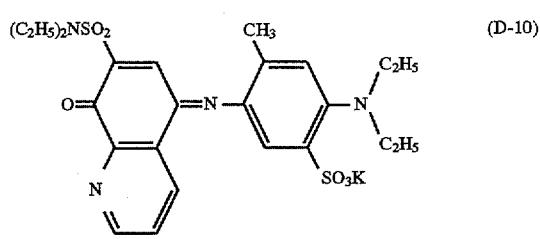
(D-10)
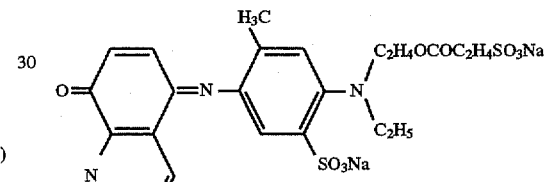
(D-11)
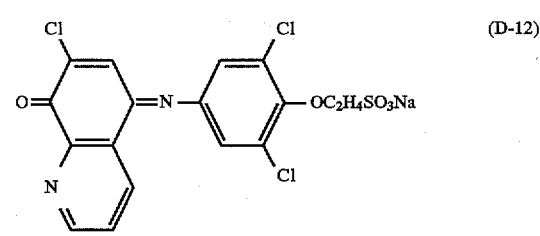
(D-12)
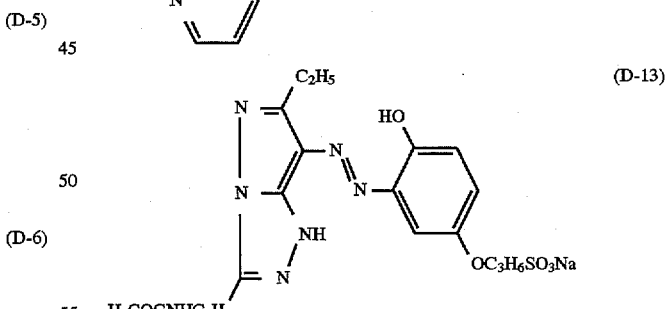
(D-13)
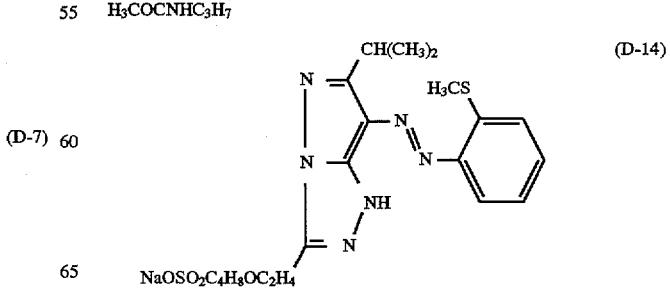
(D-14)

(D-15) 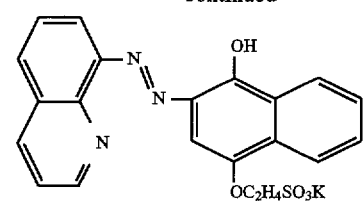
(D-16) 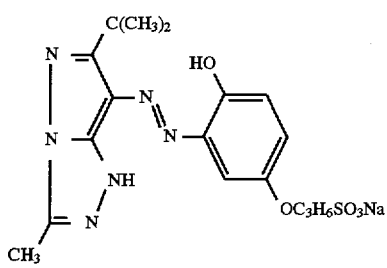
(D-17) 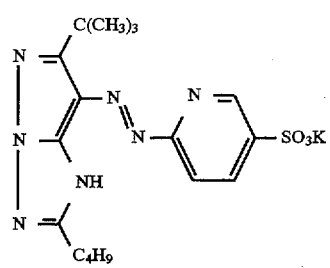
(D-18) 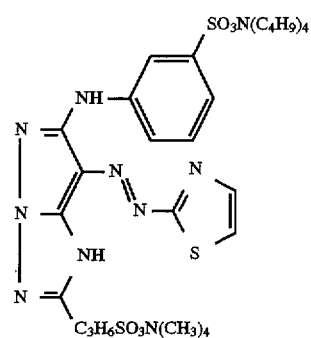
(D-19) 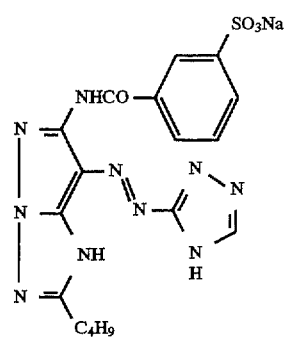
(D-20) 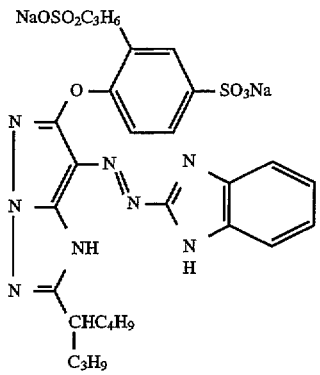
(D-21) 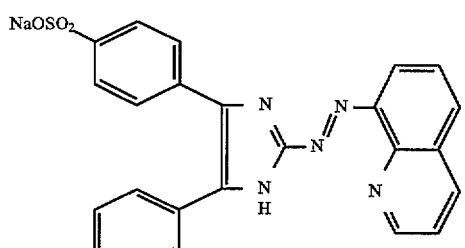
(D-22) 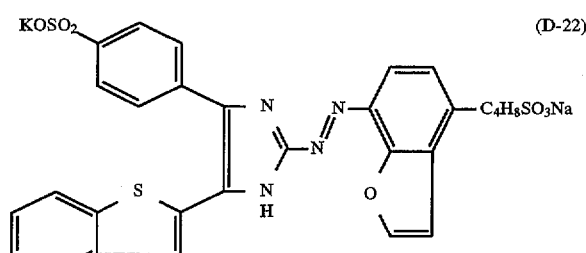
(D-23) 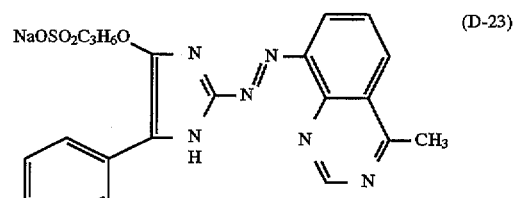
(D-24) 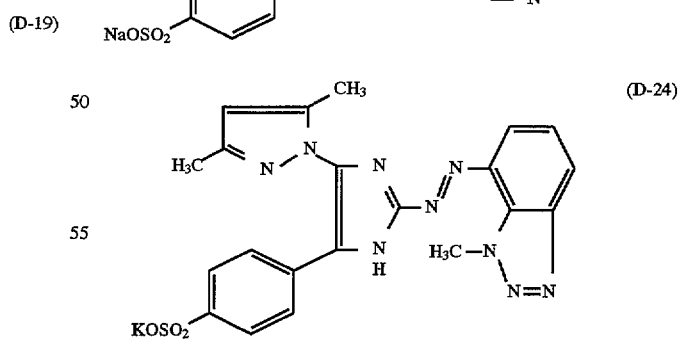

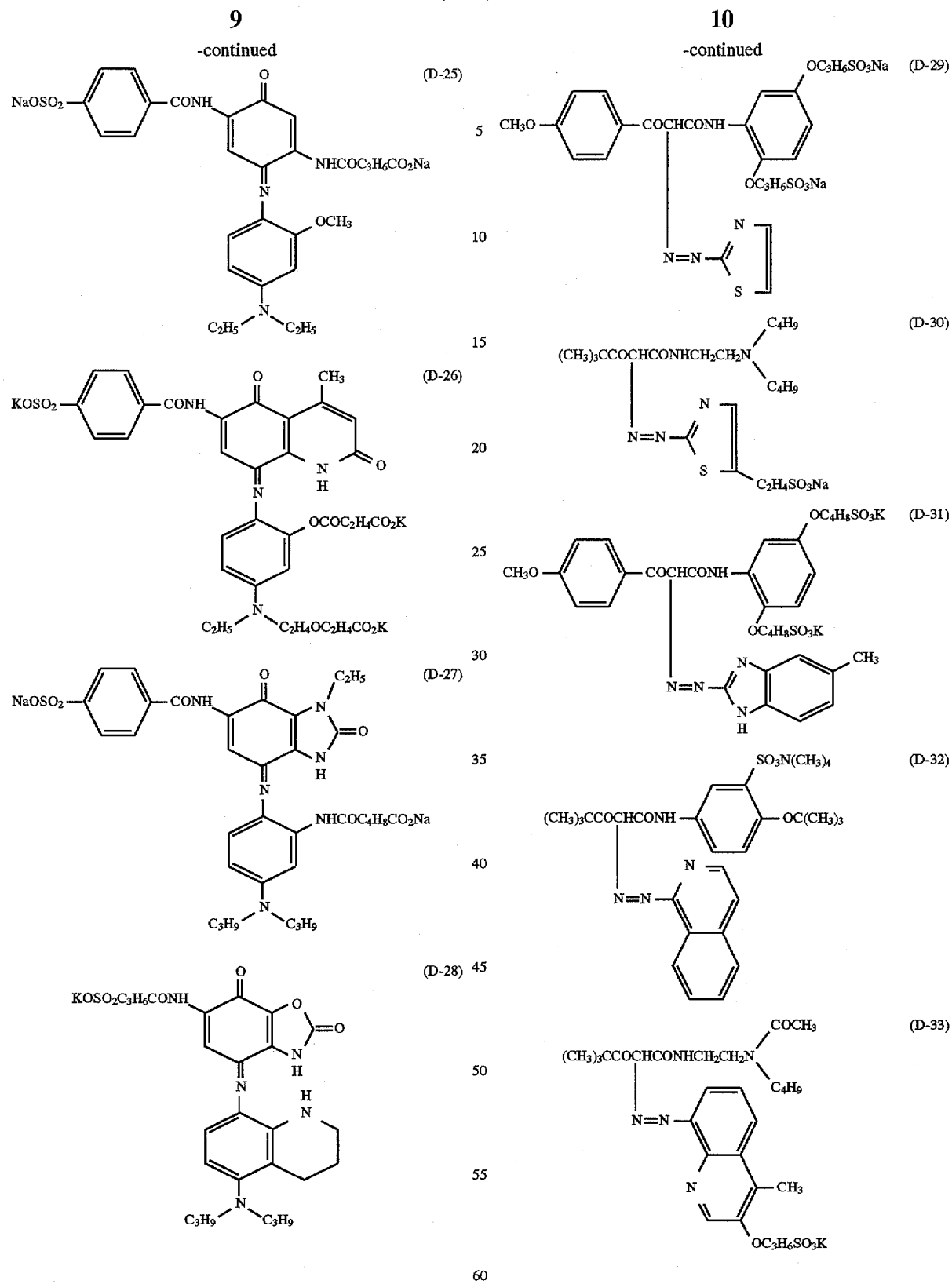

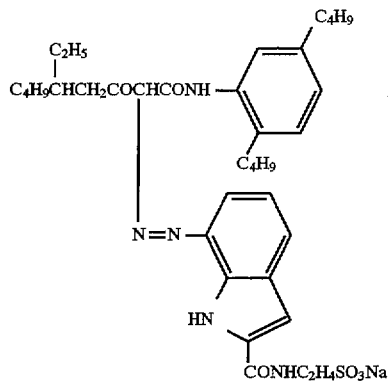
(D-34)

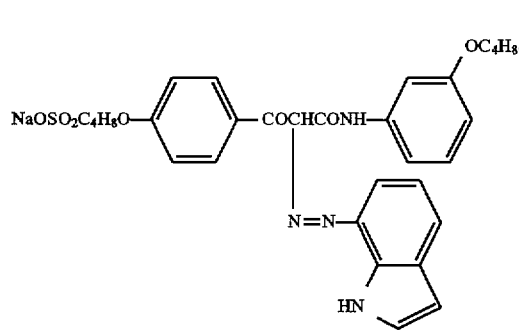
(D-35)

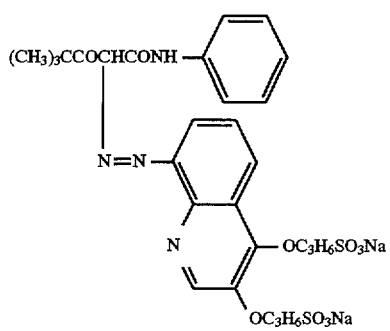
(D-36)

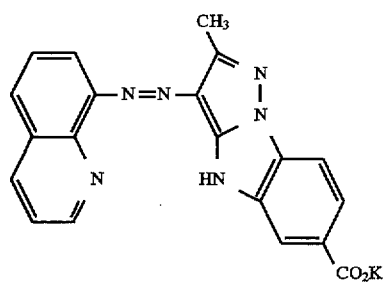
(D-37)

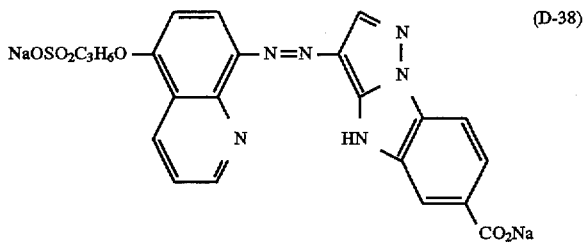
(D-38)

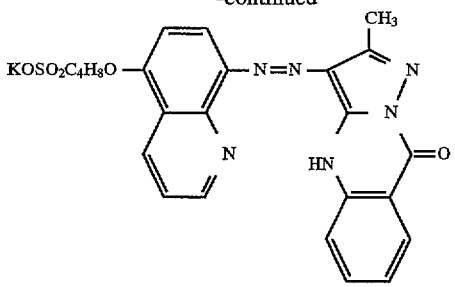
(D-39)

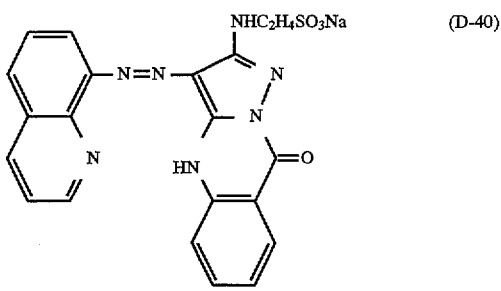
(D-40)

Of these dyes, dyes capable of co-ordinate bonding with a metal ion in three coordination positions are more preferable.

The ink forming component can be prepared by dissolving and mixing a dye and, if necessary an additive, in a solvent.

As the above-mentioned solvent, water-type and organic solvents such a keton-type, an alcohol-type, an ester-type, an ether-type, a halogen-type, a nitrogen-containing type or a sulfur-containing type are cited. When a water-soluble dye is used, it is preferable to use it in the form of mixed solvent of water and an aliphatic alcohol or its derivative, from the viewpoint of odor.

As the above-mentioned aliphatic alcohol or its derivative, aliphatic alcohol such as methanol, ethanol, 1-propanol, 2-propanol, 1-buthanol, 2-buthanol, 2-methyl-2-propanol, 1-pentanol, 3-methyl-1-buthanol, 2-methyl-1-buthanol, 3-pentanol and 2-methyl-2-buthanol, polyatomic alcohols such as ethylene glycol, diethylene glycol, triethylene glycol, propylene glycol, polyethylene glycol and glycerin and polyatomic alcohol derivatives such as ethylene glycol monomethyl ether, ethylene glycol monoethyl ether, diethylene glycol monoethyl ether, diethylene glycol monobutyl ether, diethylene glycol dimethyl ether, triethylene glycol dimethyl ether, ethylene glycol monomethyl ether acetate and diethylene glycol monoethyl ether acetate are cited.

In this case, ink viscosity is dependent on the kind of polyatomic alcohol and/or its derivative. Therefore, depending upon the kind of recording method, it is necessary to reduce responding frequency, to reduce the speed of spraying solution and to increase driving voltage. Accordingly, it is preferable to add the polyatomic alcohol and/or its derivative ordinarily in a range of 1 to 50 weight % and preferably in a range of 5 to 40 weight %, into the ink forming component. In addition, the aliphatic alcohol is extremely soluble in water, polyatomic alcohol and/or its derivative, a wetting agent (explained later) and a dye. They are added for improving solubility when a mixed solvent is used. They are also effective as an adjuster for the surface tension of ink. Incidentally, it is preferable that the surface tension of ink is set in a range of 25 to 65 dyne/cm. Therefore, the added amount of the above-mentioned aliphatic alcohol is changed from time to time in order that the surface tension is included in the above-mentioned range. It is ordinarily added in a range of 0.5 to 20 weight % and preferably in the range of 1 to 15 weight % in the ink forming component.

In addition, various additives such as a moisture-proof agent, a binding resin, a viscosity regulator, a surface tension adjuster, a conductivity adjuster, a hydrogen ion density adjuster, an anti-mildew disinfectant, an antiseptic, a rust preventive and an oxygen absorber may be added. These additives are ordinarily added by 0 to 15 weight % and preferably added by 0 to 10 weight %.

<Second embodiment>

The second embodiment of the invention is characterized in that the ink contains a compound containing a metal ion capable of co-ordinate bonding with the dye to be used in the first embodiment in two or more coordination position.

As compound containing a metal ion with which a dye is capable of coordinate-bonding in two or more coordination position, salts composed of metal ions and inorganic or organic anion and coordinated metal ion complexes are cited. As the above-mentioned compound, those represented by the following Formula (12) are cited.

$$[M^{l+}(X^{m-})_o(Y)_p](Z^n)_q \quad \text{Formula (12)}$$

wherein M represents a metal; X represents a ligand of an anion; Y represents a neutral ligand; Z represents a counterion; l represents a natural number of 1 to 5; m represents a natural number of 1 to 6; n represents $-2$ through 2 ($n \neq 0$); and o, p and q independently represent integers of 0 through 6.

Hereinafter, compounds represented by Formula (12) will be described.

As a metal ion represented by $M^{l+}$, for example, silver (I), aluminum (III), gold (III), cerium (III and IV), cobalt (II and III), chrome (III), copper (I and II), europium (III), iron (II and III), potassium (III), germanium (IV), indium (III), lanthanum (III), manganese (II), nickel (II), palladium (II), platinum (II and IV), rhodium (II and III), ruthenium (II, III and IV), scandium (III), silicon (IV), samarium (III), titanium (IV), uranium (IV), zinc (II) and zirconium (IV) are cited. Of these metal ions are preferable metal ions capable of coordinate bonding with a dye of a bidentate ligand in four or six coordination positions and metal ions capable of coordinate bonding with a dye of a tridentate ligand in six coordination positions. The specifically preferable transition metal ions are zinc ion (II), nickel ion (II), cobalt ion (II and III), copper ion (II), rhodium ion (II and III), ruthenium ion (II and III), palladium ion (II) and platinum ion (II and IV).

As a ligand of an anion represented by $X^{m-}$, a halide ion, a hydroxy ion, a nitrate ion, a carboxylate ion, a cyano ion, a peroxy ion, an acetylacetonatho ion and its derivatives, phenolate ion of salicylaldehyde and its derivatives, a glycynato ion, a thiocyanate ion, an azide ion, a carbonate ion, an oxalate ion, a sulfate ion andan oxalite ion are cited.

As a neutral ligand represented by Y, ammonia, water, triphenylphosphine, ethylenediamine, 1,3-propanediamine, 2,2'-bipyridine, 1,10-phenanetolorine, glycineamido, diethylene triamine, 2,2',2"-terpyridine and triethylene tetramine are cited.

A counter ion represented by $Z^n$ becomes an anion or a cation if necessary in order to neutralize electric charges. As the above-mentioned anion, a halide ion (fluoride, chloride, bromide and iodide), a sulfite ion, a sulfate ion, an alkyl or aryl sulfonic acid ion, a nitrate ion, a nitrite ion, a perchloroacid ion, carboxylate (acetate, trifluacetate and stearylate), sulycinate, benzoate, hexafluorophosphate and tetrafluoroborate are cited. In addition, as a cation, lithium (I), sodium (I), potassium (I), ammonium and phosphonium are cited.

As practical compounds containing a metal ion with which a dye is capable of coordinate-bonding in two or more coordination positions, zinc chloride, zinc sulfate, zinc nitrate, zinc acetate, nickel chloride (II), nickel sulfate (II), nickel nitrate (II), nickel acetate (II), nickel stearylate (II), bis(2,4-pentanedionato)diaquanickel (II), bis (dimethylglyoxymato) nickel (II), bis(3-methoxycarbonyl-2,4-tetodecanedionato) nickel(II), tris(glycineamido) nickel (II) tetraphenyl borate, cobalt chloride (II), cobalt acetate (II), cobalt thiocyanate (II), cobalt hexaanemine (III) chlorinated product, tris(ethylenediamine) cobalt (III) chlorinated product, cis-dichlorotetraanmine cobalt (III) chlorinated product, ammonium tetranitrodiamine cobalt (III) acid, potassium hexacyano cobalt (III) acid, copper chloride (II), copper sulfate (II), copper tetrafluoro borate (II), bis (ethylenediamine) copper (II) sulfate, rhodium chloride (II), rhodium sulfate (II), dirhodium tetraacetic acid (II), hexaanmine rhodium (III) chloride, potassium hexacyanorhodium (III), rutheniumbromide (III), hexaanmine ruthenium (III) bromide, potassium hexacyano ruthenium (II) acid, paradium sulfate (II), ammonium acid of tetrachloro paradium (II), tetraanmine paradium (II) chloride, tetraanmine platinum (II) chloride, bisethylenediamine platinum (II) chloride, hexaanmine platinum (IV) chloride and tris (ethylenediamine)platinum (IV) chloride are cited.

The above-mentioned compounds containing a metal ion with which a dye is capable of coordinate-bonding in two or more coordination positions can be adjusted ordinarily in 0.1 to 50 weight % and preferably in 1 to 30 weight % as an ink forming component.

For other ink forming components, the additive and the solvent described in the first embodiment can be selected and used. With regard to the adjustment method of ink, the method described in the first embodiment can be used as it is.

(2) Recording sheet

The present invention relating to a recording sheet is characterized in containing a compound containing a metal ion with which a dye is capable of coordinate-bonding in two or more coordination position as described in the second embodiment of ink for recording. As aforesaid compound, the above-mentioned compounds can be appropriately selected and used.

As a substrate for a recording sheet, for example, various papers such as paper, a coated paper and a synthetic paper (polypropylene, polystylene or complex materials wherein polypropylene or polystylene is sealed with paper) and various films having mono layer or two or more laminated layers composed of resin such as polyorephin resins, vinyl chloride resins, stylene resins, polyethylene terephthalate, polyethylenenaphthalate, polyimido, polycarbonate, polyeter eterketon, polyarylate, polysulfon and polyetersulfon and provided with orientation, if necessary, are cited. There is no practical limit to the thickness of the substrate. However, 30 to 800 μm is preferable and 50 to 500 μm is more preferable.

Among the above-mentioned substrate, resin films wherein recording ink cannot be dyed can be used as a recording sheet by providing an ink-receiving layer on the recording surface. On the contrary, to a paper which can receive recording ink, a metal ion, which is an essential component, with which a dye is capable of coordinate-bonding in two or more coordination positions is papered at a stage when a paper is manufactured in advance or is impregnated after the paper is manufactured. Otherwise, in the same manner as for resin film, the surface of the paper may be covered with the ink receiving layer.

It is preferable, from the viewpoint of increasing the absorption property of ink, that, when the surface of the substrate is covered for forming an ink receiving layer, the recording sheet is constituted by a component mainly composed of a super-fine grained inorganic pigment in addition to a compound, contained as an essential component, containing a metal ion with which a dye is capable of coordinate-bonding in two or more coordination positions. The primary grain size of the superfine-grain inorganic pigment used in the above-mentioned case is ordinarily 100 nm or less and preferably 50 nm or less. The smaller the grain size is, the more the surface covering becomes uniform to be preferable. The above-mentioned superfine grain inorganic pigment is ordinarily used by dispersing it in a colloid state while keeping the size of the primary grain in a solvent.

As the above-mentioned super fine grain inorganic pigment, for example, silica (colloidal silica), alumina or alumina hydrate (aluminazol, colloidal alumina, a cation aluminum oxide or its hydrate and pseudo-boehmite), a surface-processed cation colloidal silica, aluminum silicate, magnesium silicate, magnesium carbonate, titanium dioxide and zinc oxide are cited. Of these, pigments whose primary grains are porous are more preferable. Even in the case of unporous pigments, it is preferable that the pigment is coagulated when a coating solution is prepared and it is further coagulated when the coating solution is dried so that a porous layer is formed to be the ink receiving layer.

The above-mentioned super fine grain inorganic pigment can be used singly or two or more thereof can be used in combination.

As an inorganic pigment used with the super fine grain inorganic pigment in combination, any conventional inorganic pigments can be used as long as they do not hinder the objectives of the present invention. For example, light calsium carbonate, heavy calcium carbonate, kaoline, talc, calsium sulfate, barrium sulfate, titanium dioxide, zinc oxide, zinc sulfate, zinc carbonate, satin white, aluminum silicon, diatomaceous, calsium silicon, synthetic amorphous silica, aluminum hydroxide, lithopone, zeolite, hydrolitic halloysite, magnesium hydroxide and synthetic mica are cited. Of these inorganic pigments, porous inorganic pigments are preferable such as porous synthetic crystalloid silica, porous calsium carbonate and porous alumina are cited. Specifically, porous synthetic amorphous silica having a large pore volume is preferable.

In addition, it is allowed that organic pigments such as stylene resings, acrylic resin particles, polyethylene, micro capsules, urea resins, meramine resins and fluorine resin particles may by used in combination, and/or in place of the above-mentioned inorganic fine grains.

The above-described super-fine grain inorganic pigments, inorganic pigments and organic pigments ordinarily make up 30 to 80 weight % and preferably 40 to 70 weight % in the receiving layer forming component.

When forming the ink receiving layer, it is preferable to add a binder resin for strengthening the ink receiving layer, in addition to the above-described super-fine grain inorganic pigments, inorganic pigments and organic pigments. As such resins, polyvinyl alcohol, vinyl acetate, aicidified starch, ethered stark, cellulose derivatives such as carboxymethyl cellulose and hydroxyethyl cellulose, casein, gelatin, soybean protein and silyl denaturated polyvinyl alcohol; maleic acid resin, conjugate diene copolymer latexes such as stylene-butadiene resin and methylmethacrylate-butadiene copolymer and acryl copolymer latexes such as a polymer or copolymer of acrylic acid ester and methacrylic acid ester; vinyl copolymer latexes such as ethylene vinyl acetic acid copolymer; a functional denaturated polymer latex of the above-mentioned various polymers by means of a functional group containing monomers such as a carboxyl group; water binders such as a thermohardening synthetic resin type including a melanine resin and a urea resin; and synthetic resin binders such as polymethylmethacrylate, a polyurethane resin, unsaturated polyester resin, vinyl chloride-vinyl acetic acid copolymer, polyvinyl acetal type resins and alkyd resins are cited. These resins may be used independently or two or more thereof maybe used in combination. The binder resins ordinarily make up 10 to 70 weight % and preferably 20 to 50 weight % of the receiving layer forming component.

In addition, other additives such as pigment dispersants, viscosity enhancing agents, fluidity improving agents, antifoaming agents, foaming-inhibiting agents, mold lubricants, bubbling agents, permeating agents, coloring dyes, fluorescent brightening agents, UV absorbers, anti-oxidation agents, anti-mildew agents, anti-fugal agents, agents for moisture-proofing, agents for increasing the stiffness of wet paper, agents for increasing the stiffness of dry paper and anti-static agents may be added depending upon the kind of substrate so long as such do not hinder the objects of the present invention. The above-mentioned various additives can be added ordinarily in a range of 0 to 10 weight % in the receiving layer forming component.

In the present invention, methods which cover the surface of the substrate include a coating method and a impregnation method depending upon the kind of substrate. The thickness of the ink receiving layer is appropriately selected from ordinarily 0.5 to 30 $g/m^2$ and preferably 1.0 to 20 $g/m^2$.

When paper is used for the substrate, as a base paper, wooden pulp such as chemical pulp including LBKP and NBKP, mechanical pulp including GP, PGWRMP, TMP, CTMP, CMP and CGP and old paper pulp including DIP and conventional pigments are used as main components. These are mixed by the use of one or more additives such as binders, sizing agents, fixing agents, yield-improving agents, cationated agents, paper stiffness enhancing agents, and then, are manufactured by the use of various apparatuses such as long-dot papering machines, circle-dot papering machines and twin wire papering machines. In addition base papers subjected to a sizing press with stark and polyvinyl alcohol are also included. The surface of such base papers may be covered as is, or for controlling smoothness, the base may be subjected to calendering processes by the use of a machine calendering apparatus, a TG calendering apparatus and a soft calendering apparatus.

As method to coat or impregnate the ink receiving layer, various on-machines or off-machines such as various blade coaters, roll coaters, air-knife coaters, bar coaters, rod coaters, gate roll coaters, curtain coaters, short dwell coaters, graveure coaters, flexo graveure coaters and size presses may be considered.

In addition, a recording sheet of the present invention may be provided with other layers in addition to a substrate and the ink receiving layer as necessary. For example, when the substrate is a resin film, an intermediate layer may be provided for increasing the adhesive force between the substrate and the ink receiving layer.

(3) Ink jet recording method
<First embodiment>

The recording method of the present invention is characterized by spraying ink containing a metal ion with which a dye is capable of coordinate-bonding in two or more coordination positions onto a recording sheet containing a compound having metal ion (also referred to as "a metal ion containing compound") in accordance with an image signal for forming images.

The recording method of image will be explained in detail. When a dye sprayed from a recording head is brought into contact with a metal ion containing compound on the recording sheet, a chelate complex is formed there so that an image as a chelate dye image is formed. In this occasion, when the metal ion containing compound is a complex having a ligand, the above-mentioned ligand and the dye are subjected to ligand-exchange so that the chelate dye image is formed.

In the above-mentioned occasion, the recording sheet is designed so that the amount of metal ion complex having a ligand contained in the recording sheet is larger than the amount of metal ions which completely form the chelate dye image with a dye used for forming the image. The relationship of the complex stability constants of the metal ion complex having a ligand contained in the recording sheet and complex of aforesaid metal ion and the dye is designed in such a manner that the former complex stability constant<the latter complex stability constant.

Incidentally, in the above-mentioned situation, when the difference of the complex stability constants is small even in the case when the above-mentioned relationship is satisfied, in other words, when the dye only contacts the metal ion containing compound in the recording sheet and the ligand exchanging reaction is not conducted smoothly, it is preferable to complete the chelate position exchanging reaction by heating or heating and pressing aforesaid recording sheet after spraying ink onto the recording sheet.

As an ink jet recording system of the present invention, either of a drum scanning type, a serial scanning type and a plane scanning type may be used. As a method which sprays liquid ink in a small drop state, liquid column or mist state, anything can be selected and used suitably from continuous spraying types such as a charge amount control type and a splashing type, on-demand type such as Kyser type, Gould type, Micro-bubble type, Bubble-jet type, Stemme type, Metal diaphragm type, opening type, Lamination type, Spark jet type and an electric permeating type and recording systems such as an intermittent spraying type and an ink mist type.

<Second embodiment>

The recording system of the second embodiment of the present invention is characterized in that, by the use of a commercially available recording sheet or a newly-produced recording sheet wherein a metal ion containing compound is removed from the recording sheet described in item (2), ink containing only the metal ion containing compound is sprayed at least onto an image forming region so that an image forming layer region containing the metal ion containing compound is formed in advance, and then, ink containing a metal ion with which a dye is capable of coordinate-bonding in two or more coordination positions is sprayed from a recording head in accordance with an image signal for forming an image.

In the above-mentioned manner, by spraying the ink forming component containing the dye in accordance with an image signal, the metal ion containing compound formed before aforesaid ink was sprayed, and the chelate complex are formed. As a result, a chelate dye image is formed on the recording sheet. Here, the metal ion containing compound sprayed in advance onto the image forming layer region is sprayed in such a manner that its amount is larger than the amount necessary to completely form the chelate dye image with a dye sprayed in the next step.

In addition, when ligand exchanging reaction is not conducted smoothly, in the same manner as in the first embodiment, it is preferable to complete the chelate exchanging reaction by heating or heating and pressing aforesaid recording sheet after spraying the recording ink containing the dye onto the recording sheet.

Incidentally, it goes without saying that, as a recording sheet used here, the recording sheet used in the first embodiment may be used in addition to the one described above.

<Third embodiment>

The recording system of the third embodiment of the present invention is characterized in that, by the use of a commercially available recording sheet or a newly-produced recording sheet wherein a metal ion containing compound is removed from the recording sheet described in item (2), ink containing a metal ion with which a dye is capable of coordinate-bonding in two or more coordination positions is sprayed from the recording head in accordance with the image signal, and then, ink containing only the metal ion containing compound is sprayed onto at least the aforesaid dye spraying region for forming an image.

In the above-mentioned occasion, by spraying the ink forming component containing the metal ion containing compound, the dye formed before aforesaid ink was sprayed and the chelate complex are formed. As a result, a chelate dye image is formed on the recording sheet. Here too, the metal ion containing compound sprayed in advance onto the image forming layer region is sprayed in such a manner that its amount is larger than the amount necessary to completely form the chelate dye image with a sprayed dye.

In addition, when the ligand exchanging reaction is not conducted smoothly, in the same manner as in the first embodiment, it is preferable to complete the chelate exchanging reaction by heating or heating and pressing aforesaid recording sheet after spraying the recording ink containing only the metal ion containing compound onto the recording sheet.

Incidentally, it goes without saying that, as a recording sheet used here, in the same manner as in the second embodiment, the recording sheet used in the first embodiment may be used in addition to one described above.

EXAMPLE

Hereunder, the present invention will be explained referring to the examples. However, the present invention is not limited thereto. Incidentally, "part" herinafter represent part by weight in an effective component.

Example 1

Hereinafter, ink for recording use and recording sheets of the present invention and comparative examples were prepared.

<Ink for recording>

The following compounds were respectively warmed and stirred and dissolved. After the solutions were left until the temperature of each of them became room temperature, these compounds were filtrated with a teflron filter whose thickness was 0.20 μm to prepare ink for recording.

| | |
|---|---|
| 1) Dye [D-16] | 3.0 parts |
| Triethylene glycol | 15.0 parts |
| Isopropanol | 2.5 parts |
| Triethanol amine | 0.2 part |
| Ion-exchanged water | 79.3 parts |
| 2) Dye [D-1] | 3.0 parts |
| Propylene glycol | 40.0 parts |
| Ethanol | 10.0 parts |

-continued

|                                   |             |
|-----------------------------------|-------------|
| Sodium benzoate                   | 0.1 parts   |
| Sodium thiosulfate                | 0.1 part    |
| Ion-exchanged water               | 46.8 parts  |
| 3) Dye [D-2]                      | 2.5 parts   |
| Diethylene glycol                 | 20.0 parts  |
| Methanol                          | 5.0 parts   |
| Triethanolamine                   | 0.1 parts   |
| Ion-exchanged water               | 72.4 parts  |
| 4) Dye [D-4]                      | 3.0 parts   |
| 1,5-pentanediol                   | 20.0 parts  |
| Ethanol                           | 10.0 parts  |
| Sodium sorbate                    | 0.1 part    |
| Ammonium nitrate diisopropyl      | 0.1 part    |
| Ion-exchanged water               | 66.8 parts  |

5) Ink for recording was prepared in the same manner as in 2) except that C.I. acid red 254 was used in place of Dye [D-1].

6) Ink for recording was prepared in the same manner as in 4) except that C.I. food black 2 was used in place of Dye [D-4].

The following compounds were respectively warmed and stirred and dissolved. After that they were left until the temperature of each of them returned to room temperature, these compounds were then filtrated with a teflron filter whose thickness was 0.20 μm to prepare ink for recording containing a metal ion-containing compound.

|                        |            |
|------------------------|------------|
| Nickel choride (II)    | 5.0 parts  |
| Triethylene glycol     | 15.0 parts |
| Isopropal              | 5.0 parts  |
| Ion-exchanged water    | 75.0 parts |

8) Ink for recording was prepared in the same manner as in 5) except that nickel acetate (II) was used in place of nickel chloride (II).

<Recording sheet>

1) Recording sheets was prepared by subjecting a dispersed product having the following composition to supersonic dispersion.

| Dispersed product | |
|---|---|
| Bis(3-methoxycarbonyl-2,4-tetradecanedionato)nickel (II) | 5.0 parts |
| Calsiumcarbonate [Briliant 15 produced by Shiraishi Chemical Co., Ltd.] | 21.0 parts |
| Colloidal silica [Snowtex YL, Nissan Kagaku Co., Ltd.] | 11.5 parts |
| Methylethylketone | 62.5 parts |

Next, the above-mentioned dispersed product and a resin solution having the following composition were mixed at 2:1 in terms of weight ratio so that an ink-receiving layer forming coating solution was prepared. This coating solution was coated on a wood free paper of 105 g/m² in a manner that the weight after being dried would be 5 g/m² and dried for preparing a recording sheet.

| Resin solution | |
|---|---|
| Acrylic resin [Dianal BR-87 produced by Mitsubishi Rayon] | 10.0 parts |
| Ethylene-vinyl acetic acid copolymer [Soalex R-DH produced by Nihon Gousei Kagaku Co., Ltd.] | 15.0 parts |
| Methylethylketone | 75.0 parts |

2) The ink-receiving layer forming coating solution was prepared. This coating solution was coated on a wood free paper of 85 g/m² in such a manner that the weight after being dried would be 7 g/m² and dried for prepared as a recording sheet.

| | |
|---|---|
| Nickel chloride (II) | 5.0 parts |
| Calciumcarbonate [Brilliant 15 priduced by Shiraishi Chemical Co., Ltd.] | 32.5 parts |
| Polyvinyl alcohol [PVA124, produced by Kurare Co., Ltd.] | 12.0 parts |
| Polyacrylic acid | 0.5 part |
| Ion-exchanged water | 50.0 parts |

3) Commercially available coated paper [Mitsubishi IJ coated paper, produced by Mitsubishi Seishi Co., Ltd.]

4) A recording sheet was prepared in the same manner as in item 2) except that nickel chloride (II) was removed.

<Image forming method>

By the use of an ink jet printer of 300 dpi [HY Desk Writer C produced by Yokogawa H. P. Co., Ltd.], images were formed with combinations of inks for recording wherein dyes of the present invention and of comparative inventions were respectively dissolved and recording sheets of the present invention and of comparative inventions. As necessary, the image-formed recording sheets were heated and pressed (heating temperature: 180° C., feeding speed: 50 mm/sec. and pressure: 5.0 kg/cm]. The formed images were evaluated in accordance with the following criteria:

Blurring of image

One dotted line was recorded and the line width of the formed image was evaluated in terms of um.

| | |
|---|---|
| ⊚ | L ≦ 125 (μm) |
| ○ | 125 < L ≦ 150 (μm) |
| Δ | 180 < L (μm) |

Heat storage stability of images

2×2 cm solid image whose density was 1.00±0.10 was formed. The formed image was stored (dark room: 77° C. for one week), and then, "density after storage (t-0D-a)/density before storage (t-0D-b)" ($N_1$) was evaluated.

| | |
|---|---|
| ⊚ | 0.95 ≦ $N_1$ |
| ○ | 0.90 ≦ $N_1$ < 0.95 |
| Δ | 0.80 ≦ $N_1$ < 0.90 |
| X | $N_1$ < 0.80 |

Light storage stability of image

A 2×2 cm solid image whose density was 1.00±0.10 was formed. The formed image was subjected to a Xenon fade-meter (amount of exposure on the surface of image: 70,000 lux, temperature: 50° C. and irradiation time: one week), and then, "density after exposure (i-0D-a)/density before exposure (i-0D-b)" ($N_2$) was evaluated.

| | |
|---|---|
| ⊚ | 0.95 ≦ $N_2$ |
| ○ | 0.90 ≦ $N_2$ < 0.95 |
| Δ | 0.80 ≦ $N_2$ < 0.90 |
| X | $N_2$ < 0.80 |

2) By the use of an ink jet printer of 300 dpi, an image was recorded in an image forming area on a recording sheet with recording ink containing a metal ion-containing compound, and then, an image was recorded with ink for recording wherein the dyes of the present invention and of comparative inventions were respectively used. Following this, the recording sheet wherein the image was formed was subjected to heat and pressure in the same conditions as item 1) above as necessary. The formed image was evaluated in the same manner as in item 1) above.

3) By the use of an ink jet printer of 300 dpi, an image was recorded with ink for recording wherein the dyes of the present invention and of comparative inventions were respectively used, and then, an image was formed by spraying recording ink containing a metal ion. Following this, the recording sheet wherein the image was formed was subjected to heat and pressure at the same conditions as item 1) above, as necessary. The formed image was evaluated in the same manner as in item 1) above.

Table 1 shows the collectively evaluated results.

TABLE 1

| | Ink for recording | Recording sheet | Image forming method | Whether or not heated and pressed | Blurring of images | Heat storage stability | Light storage stability |
|---|---|---|---|---|---|---|---|
| No. 1 | 1 | 1 | 1 | no | ⊚ | ⊚ | ⊚ |
| No. 2 | 1 | 2 | 1 | no | ○ | ⊚ | ⊚ |
| No. 3 | 2 | 1 | 1 | no | ⊚ | ⊚ | ○ |
| No. 4 | 2 | 1 | 1 | yes | ⊚ | ⊚ | ⊚ |
| No. 5 | 3 | 1 | 1 | no | ⊚ | ⊚ | ⊚ |
| No. 6 | 3 | 2 | 1 | no | ⊚ | ⊚ | ○ |
| No. 7 | 4 | 2 | 1 | no | ⊚ | ⊚ | ⊚ |
| No. 8 | 4 | 2 | 1 | yes | ○ | ⊚ | ⊚ |
| No. 9 | 7, 1 | 3 | 2 | yes | ○ | ⊚ | ⊚ |
| No. 10 | 7, 2 | 3 | 2 | yes | ○ | ⊚ | ⊚ |
| No. 11 | 7, 3 | 3 | 2 | yes | ○ | ⊚ | ⊚ |
| No. 12 | 7, 4 | 3 | 2 | yes | ○ | ⊚ | ⊚ |
| No. 13 | 8, 1 | 4 | 2 | no | ⊚ | ⊚ | ○ |
| No. 14 | 8, 2 | 4 | 2 | no | ⊚ | ⊚ | ○ |
| No. 15 | 8, 3 | 4 | 2 | no | ⊚ | ⊚ | ○ |
| No. 16 | 8, 4 | 4 | 2 | no | ⊚ | ⊚ | ○ |
| No. 17 | 1, 7 | 4 | 3 | yes | ⊚ | ⊚ | ⊚ |
| No. 18 | 2, 7 | 4 | 3 | yes | ⊚ | ⊚ | ⊚ |
| No. 19 | 2, 7 | 4 | 3 | yes | ⊚ | ⊚ | ⊚ |
| No. 20 | 4, 7 | 4 | 3 | yes | ⊚ | ⊚ | ⊚ |
| No. 21 | 5 | 1 | 1 | no | ○ | △ | △ |
| No. 22 | 6 | 2 | 1 | yes | △ | △ | △ |
| No. 23 | 1 | 3 | 2 | yes | △ | △ | x |
| No. 24 | 2 | 4 | 2 | no | △ | △ | x |
| No. 25 | 2 | 4 | 3 | yes | ○ | △ | x |

EFFECTS OF THE INVENTION

Owing to the present invention, a sharp image without blurring, whose durability to heat and light is favorable, can be obtained with ink jet recording.

What is claimed is:

1. A method of recording an image on a recording sheet, the method comprising jetting an ink from a nozzle onto the recording sheet, wherein the ink comprises a dye capable of co-ordinate bonding with a metal ion in two or more coordination positions and the recording sheet comprises a compound containing a metal ion which is capable of co-ordinate bonding with the dye in two or more coordination positions to record the image on a recording sheet, wherein the dye is selected from the group consisting of the following formulas (1) through (9):

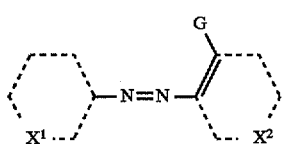
(1)

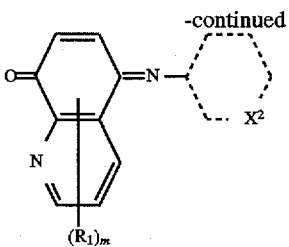
(2)

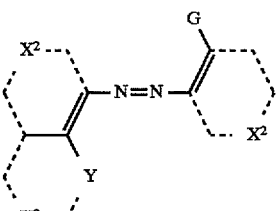
(3)

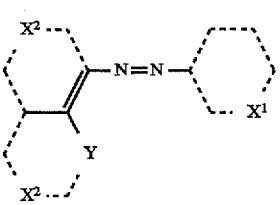
(4)

containing a metal ion capable of co-ordinate bonding with a dye in two or more coordination positions; and then jetting a recording ink from a nozzle, the recording ink comprising the dye capable of co-ordinate bonding with the metal ion in two or more coordination positions to record the image on a recording sheet, wherein the dye is selected from the group consisting of the following formulas (1) through (9):

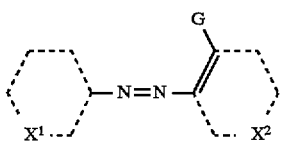
(1)

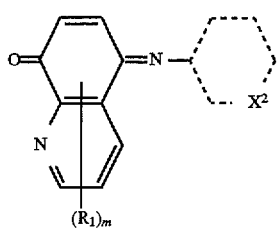
(2)

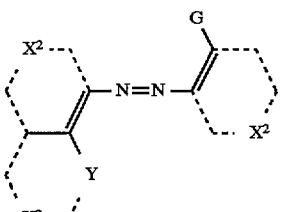
(3)

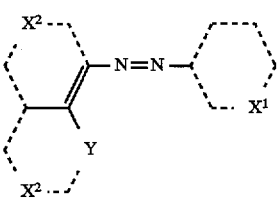
(4)

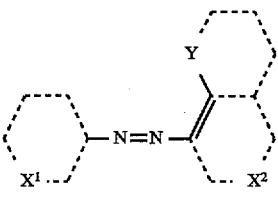
(5)

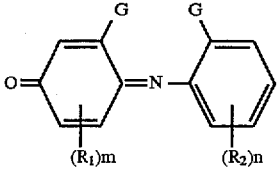
(6)

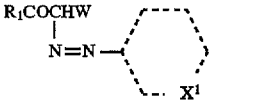
(7)

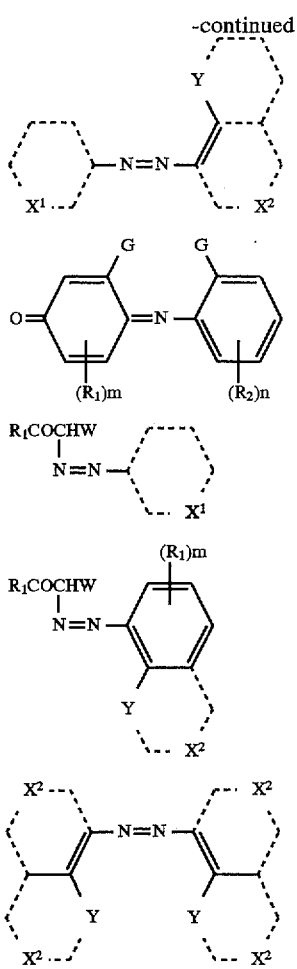

wherein $X^1$ represents an atomic group necessary to form a 5- to 7-membered heterocyclic or aromatic carbocyclic ring in which at least one position adjacent to the carbon atom bonding with an azo group is substituted with a nitrogen, oxygen, sulfur, selenium or tellurium atom; $X^2$ represents an atomic group to form a 5- to 7-membered carbocyclic or heterocyclic ring; G represents a chelating group; W represents —$COR_3$ or —$CSR_3$; Y represents —O—, —S—, —N=, —NH— or —$NR_4$—; m and n independently represent an integer of 1 to 5; $R_1$ and $R_2$ independently represent a hydrogen atom, a halogen atom, a cyano group, an alkyl group, an alkenyl group, an alkoxy group, an alkylsulfonamide group, an arylsulfonamide group, an anilino group, an acylamino group, an alkylureido group, an arylureido group, an alkoxycarbonyl group, an alkoxycarbonylamino group, a carbamoyl group, a sulfamoyl group, a sulfo group, a carboxy group, an aryl group or a heterocyclic group; R3 represents a hydrogen atom, an alkyl group, an alkenyl group, an alkoxy group, an alkylsulfonamide group, an arylsulfonamide group, an anilino group, an acylamino group, an alkylureido group, an arylureido group, a carbamoyl group, a sulfamoyl group, an aryl group or a heterocyclic group; and R4 represents an alkyl group, an alkenyl group, an aryl group or a heterocyclic group.

2. The method of claim 1, wherein after the recording, the recorded sheet is subjected to heat treatment.

3. A method of recording an image on a recording sheet, the method comprising
   jetting an ink from a nozzle onto at least image portions of the recording sheet, the ink comprising a compound

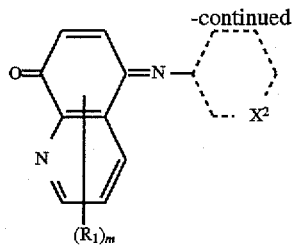
(2)

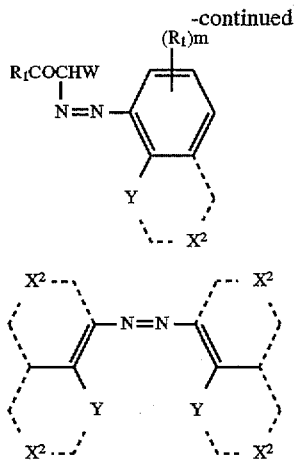
(8)

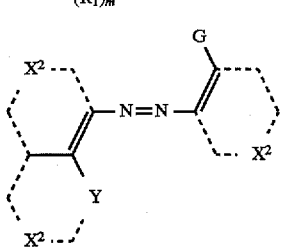
(3)

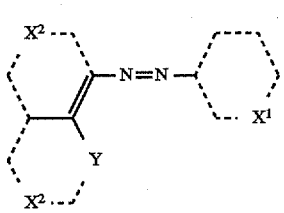
(9)

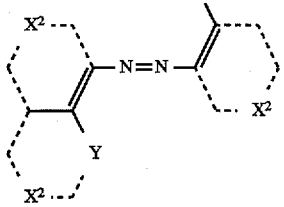
(4)

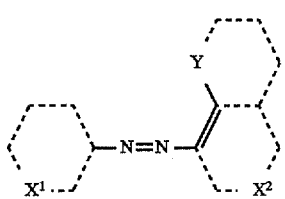
(5)

wherein $X^1$ represents an atomic group necessary to form a 5- to 7-membered heterocyclic or aromatic carbocyclic ring in which at least one position adjacent to the carbon atom bonding with an azo group is substituted with a nitrogen, oxygen, sulfur, selenium or tellurium atom; $X^2$ represents an atomic group to form a 5- to 7-membered carbocyclic or heterocyclic ring; G represents a chelating group; W represents —COR₃ or —CSR₃; Y represents —O—, —S—, —N=, —NH— or —NR₄—; m and n independently represent an integer of 1 to 5; $R_1$ and $R_2$ independently represent a hydrogen atom, a halogen atom, a cyano group, an alkyl group, an alkenyl group, an alkoxy group, an alkylsulfonamide group, an arylsulfonamide group, an anilino group, an acylamino group, an alkylureido group, an arylureido group, an alkoxycarbonyl group, an alkoxycarbonylamino group, a carbamoyl group, a sulfamoyl group, a sulfo group, a carboxy group, an aryl group or a heterocyclic group; R3 represents a hydrogen atom, an alkyl group, an alkenyl group, an alkoxy group, an alkylsulfonamide group, an arylsulfonamide group, an anilino group, an acylamino group, an alkylureido group, an arylureido group, a carbamoyl group, a sulfamoyl group, an aryl group or a heterocyclic group; and R4 represents an alkyl group, an alkenyl group, an aryl group or a heterocyclic group.

4. The method of claim 3, wherein after the recording, the recorded sheet is subjected to heat treatment.

5. A method of recording an image on a recording sheet, the method comprising the steps of:

jetting a recording ink from a nozzle onto the recording sheet, the recording ink comprising a dye capable of co-ordinate bonding with a metal ion in two or more coordination positions; and then jetting an ink from a nozzle onto at least image portions of the recording sheet, the ink comprising a compound containing a metal ion capable of co-ordinate bonding with the dye in two or more coordination positions to record the image on a recording sheet, wherein the dye is selected from the group consisting of the following formulas (1) through (9):

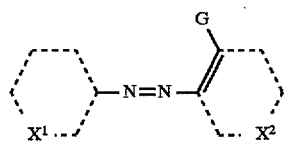
(1)

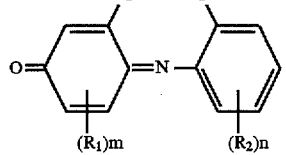
(6)

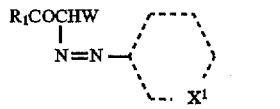
(7)

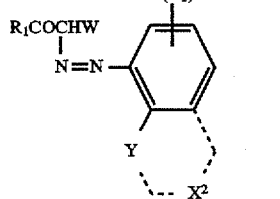
(8)

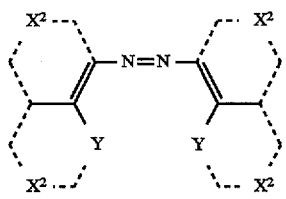
(9)

wherein $X^1$ represents an atomic group necessary to form a 5- to 7-membered heterocyclic or aromatic carbocyclic ring in which at least one position adjacent to the carbon atom bonding with an azo group is substituted with a nitrogen, oxygen, sulfur, selenium or tellurium atom; $X^2$ represents an atomic group to form a 5- to 7-membered carbocyclic or heterocyclic ring; G represents a chelating group; W represents —$COR_3$ or —$CSR_3$; Y represents —O—, —S—, —N=, —NH— or —$NR_4$—; m and n independently represent an integer of 1 to 5; $R_1$ and $R_2$ independently represent a hydrogen atom, a halogen atom, a cyano group, an alkyl group, an alkenyl group, an alkoxy group, an alkylsulfonamide group, an arylsulfonamide group, an anilino group, an acylamino group, an alkylureido group, an arylureido group, an alkoxycarbonyl group, an alkoxycarbonylamino group, a carbamoyl group, a sulfamoyl group, a sulfo group, a carboxy group, an aryl group or a heterocyclic group; R3 represents a hydrogen atom, an alkyl group, an alkenyl group, an alkoxy group, an alkylsulfonamide group, an arylsulfonamide group, an anilino group, an acylamino group, an alkylureido group, an arylureido group, a carbamoyl group, a sulfamoyl group, an aryl group or a heterocyclic group; and R4 represents an alkyl group, an alkenyl group, an aryl group or a heterocyclic group.

6. The method of claim 5, wherein after the recording, the recorded sheet is subjected to heat treatment.

7. Ink for ink-jet recording comprising a dye capable of co-ordinate bonding with a metal ion in two or more coordination positions, wherein the dye is selected from the group consisting of the following formulas (1) through (9):

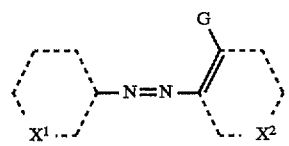
(1)

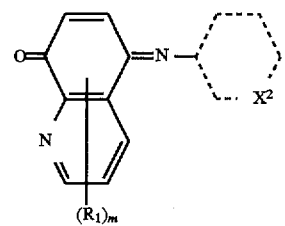
(2)

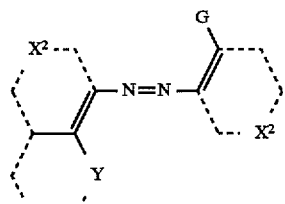
(3)

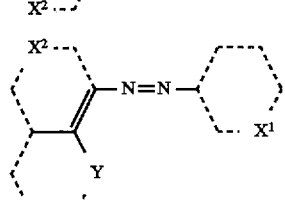
(4)

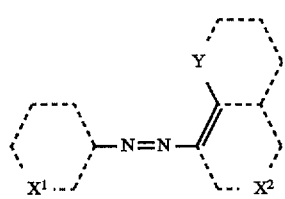
(5)

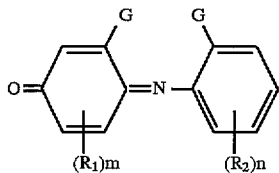
(6)

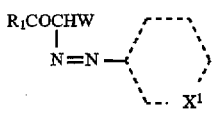
(7)

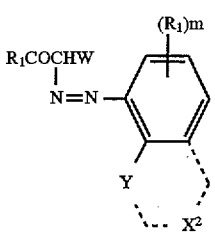
(8)

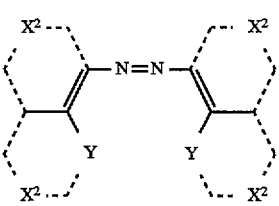
(9)

wherein $X^1$ represents an atomic group necessary to form a 5- to 7-membered heterocyclic or aromatic carbocyclic ring in which at least one position adjacent to the carbon atom bonding with an azo group is substituted with a nitrogen, oxygen, sulfur, selenium or tellurium atom; $X^2$ represents an atomic group to form a 5- to 7-membered carbocyclic or heterocyclic ring; G represents a chelating group; W represents —$COR_3$ or —$CSR_3$; Y represents —O—, —S—, —N=, —NH— or —$NR_4$—; m and n independently represent an integer of 1 to 5; $R_1$ and $R_2$ independently represent a hydrogen atom, a halogen atom, a cyano group, an alkyl group, an alkenyl group, an alkoxy group, an alkylsulfonamide group, an arylsulfonamide group, an anilino group, an acylamino group, an alkylureido group, an arylureido group, an alkoxycarbonyl group, an alkoxycarbonylamino group, a carbamoyl group, a sulfamoyl group, a sulfo group, a carboxy group, an aryl group or a heterocyclic group; R3 represents a hydrogen atom, an alkyl group, an alkenyl group, an alkoxy group, an alkylsulfonamide group, an arylsulfonamide group, an anilino group, an acylamino group, an alkylureido group, an arylureido group, a carbamoyl group, a sulfamoyl group, an aryl group or a heterocyclic group; and R4 represents an alkyl group, an alkenyl group, an aryl group or a heterocyclic group.

8. The ink for ink-jet recording of claim 7, wherein the chelating group represents —OR', —NHR', —SR', —SeR' or —TeR', wherein R' represents a hydrogen atom, an alkyl group, a phenyl group or a carbonyl group.

9. The ink for ink-jet recording of claim 7, wherein the dye is a water soluble dye.

10. The ink for ink-jet recording of claim 9, wherein the metal ion is a transition metal ion.

11. The ink for ink-jet recording of claim 7, further comprising a compound containing a metal ion which is capable of co-ordinate bonding with the dye in two or more coordination positions.

* * * * *